(No Model.)
H. F. DERNELL.
ADJUSTABLE CLEVIS ARM FOR ICE PLOWS.
No. 412,483.          Patented Oct. 8, 1889.
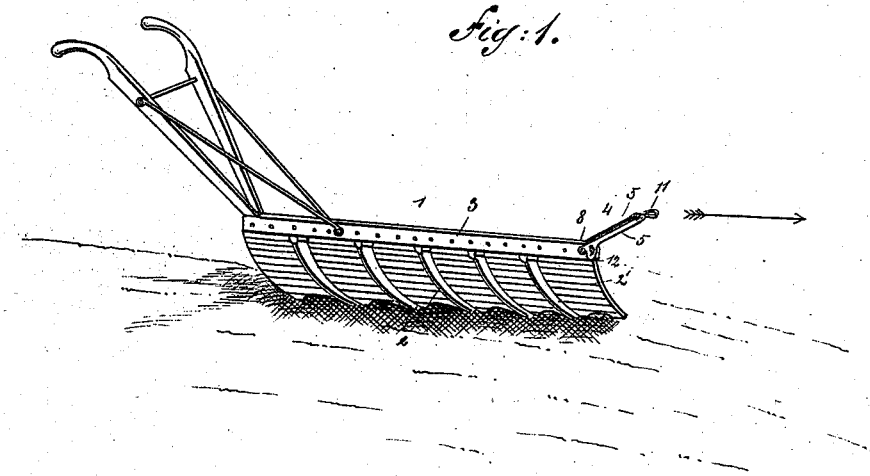
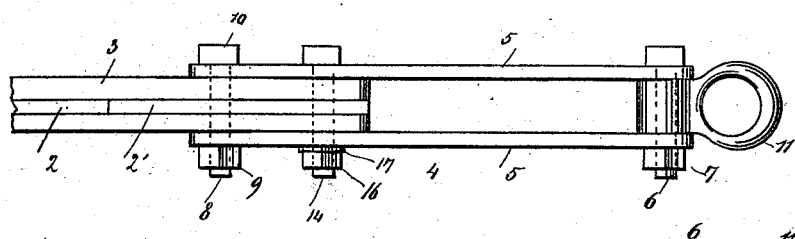
WITNESSES:
INVENTOR:
H. F. Dernell
BY
Munn & Co
ATTORNEYS.

UNITED STATES PATENT OFFICE.

HERMAN F. DERNELL, OF ATHENS, NEW YORK.

ADJUSTABLE CLEVIS-ARM FOR ICE-PLOWS.

SPECIFICATION forming part of Letters Patent No. 412,483, dated October 8, 1889.

Application filed November 30, 1888. Serial No. 292,248. (No model.)

*To all whom it may concern:*

Be it known that I, HERMAN F. DERNELL, of Athens, in the county of Greene and State of New York, have invented a new and Improved Adjustable Clevis-Arm for Ice-Plows, of which the following is a full, clear, and exact description.

This invention relates to clevises for ice-plows.

The invention has for its object to provide a clevis-connection especially intended for use with ice-plows, by means of which the clevis may be vertically adjusted and the draft of the plow so regulated as to prevent the plow from being tipped forward, and to cause a steady depth of cut of the teeth.

The invention consists in an adjustable clevis-arm for ice-plows, constructed and arranged as hereinafter described and claimed.

Reference is to be had to the accompanying drawings, forming a part of this specification, in which similar figures of reference indicate corresponding parts in all the views.

Figure 1 is a perspective view of an ice-plow with the invention attached. Fig. 2 is an enlarged plan view of the forward end of the plow-beam and the invention attached thereto. Fig. 3 is a side view thereof, and Fig. 4 is a view similar to Fig. 3 with the invention detached.

Heretofore serious difficulties have existed in using ice-plows, owing to the location of the clevis directly on the end of the plow-beam, whereby the front tooth of the plow tends to sink into the ice, owing to the draft of the plow, and the latter is tilted forward on its front tooth, its handles being jerked out of the hands of the man guiding the plow. Moreover, with the direct connection of the clevis to the plow, and the line of draft resulting therefrom, when the cutting-teeth of the ice-plow are very sharp, or "rank," as it is termed, they tend to bury themselves in the ice when the draft is applied, and when the cutting-teeth are dull they fail to cut the ice at the proper depth. To obviate these objections, I have provided an arm having a clevis secured to one end thereof, the arm being pivoted at its other end to the plow-beam in a particular way, with means for permitting the arm to be raised and lowered on its pivot and held in vertically-adjusted position.

1 indicates an ice-plow of a well-known form of construction, in which the ice-cutting teeth 2 depend from the beam 3. At the forward end of the beam 3 is mounted a vertically-swinging arm 4, consisting, preferably, of two parallel bars 5, connected together at their forward end by a bolt 6 and nut 7, and at their rear end pivoted to a bolt 8, extending through a hole 8' in the beam 3, and through the cleaning-tooth 2', and held thereon by a nut 9 and the head 10 of the bolt. Upon the bolt 6 is mounted a clevis 11. The arm 4 projects a short distance in advance of the beam 3, and may be provided with suitable means for adjusting and holding it in vertically-adjusted position. As here shown, this is done by means of depending arms 12 on the bars 5 adjacent to their rear ends, and formed with curved slots 13, through which projects a bolt 14, extending through a hole 15 in the beam 3, and having on one end a tightening-nut 16 and washer 17. By this means the arm 4 may be held in any adjusted vertical position, the nut 16 being loosened and the arm 4 raised or lowered, as desired, and the nut 16 then tightened. It will be observed that the point of the clearing-tooth 2' is located some distance in advance of the outer end of the plow-beam. If a clevis is directly attached to the end of the plow-beam, as has been hitherto done, the effect has been to cause the point of the clearing-tooth 2' to bury itself in the ice and have the plow violently tilted forward. The clevis 11 being located on the outer end of the arm 4, causes the draft to be so brought to bear on the plow with reference to the clearing-tooth 2' that the point of the latter, by not extending beyond the clevis, will not tend to bury itself in the ice or cuttings and suddenly tilt the plow forward. The clevis-arm projecting forward from the end of the plow-beam practically lengthens the latter, and thereby enables the plow to move steadily. When the teeth 2 are very sharp or rank, the arm 4 may be lowered and held by nut 16 in this position, and the draft will then be such that the teeth 2 will be held from burying themselves; and when the teeth 2 are dull the arm 4 may be raised and held by nut 16 in raised position, thereby causing the draft to force the teeth 2 downward in the ice sufficiently to cut the required depth. By having the arm 4 formed with the two bars 5 an opening is afforded to permit chips and loose material passing up the front of clearing-tooth 2' to be carried off.

By means of this invention the difficulties above mentioned in the use of ice-plows are obviated and a very efficient ice-plow is provided; an ice-plow is enabled to be driven with an even, steady motion, and by the adjustment of the clevis-arm driven so as to cut neither too deep nor too little.

Having thus described my invention, what I claim as new, and desire to secure by Letters Patent, is—

1. The combination, with an ice-plow having an inclined clearing-tooth with a point located beyond the forward end of the plow-beam, of a vertically-swinging arm pivoted at its rear end to the forward end of the plow-beam and projecting beyond the same clevis at the forward end of the projecting arm located in advance of the point of the clearing-tooth, and means for holding the projecting arm in vertically-adjusted position, substantially as shown and described.

2. The combination, with the ice-plow 1, having the inclined clearing-tooth 2' projecting beyond the forward end of plow-beam 3, of the vertically-swinging arm 4, consisting of bars 5, connected at their forward end by a bolt 6 and 7, and pivoted at their rear end to a bolt 8 on the forward end of plow-beam 3, with depending arms 12 located adjacent to their rear end and having curved slots 13, a bolt 14, passing through beam 3 and slots 13, with a nut 16 and washer 17, and a clevis 11, mounted on bolt 6, substantially as shown and described.

HERMAN F. DERNELL.

Witnesses:
E. W. CADY,
C. SEDGWICK.